No. 646,161. Patented Mar. 27, 1900.
J. D. ATKINSON.
HAND POWER FOR BICYCLES.
(Application filed Aug. 24, 1898.)
(No Model.)
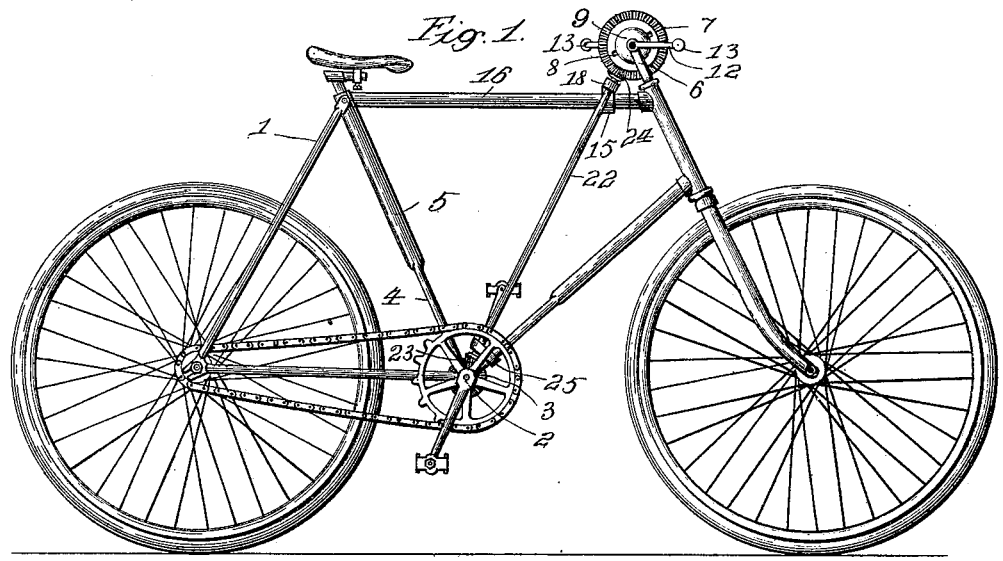
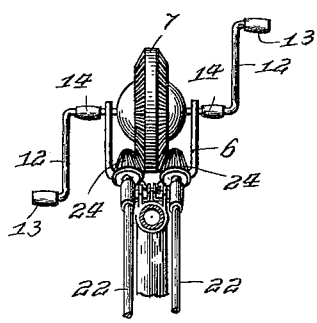
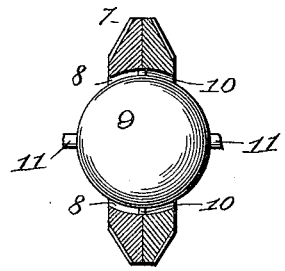
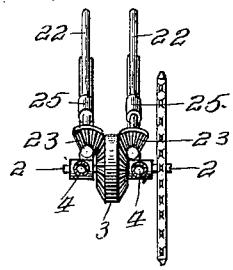
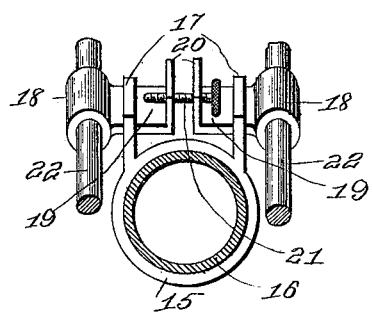
WITNESSES:
Herbert Bradley
Edward K. Allen
INVENTOR
John D. Atkinson
BY Knight Bros
ATTORNEY.

UNITED STATES PATENT OFFICE.

JOHN D. ATKINSON, OF SEATTLE, WASHINGTON.

HAND-POWER FOR BICYCLES.

SPECIFICATION forming part of Letters Patent No. 646,161, dated March 27, 1900.

Application filed August 24, 1898. Serial No. 689,406. (No model.)

*To all whom it may concern:*

Be it known that I, JOHN D. ATKINSON, a citizen of the United States, and a resident of Seattle, in the county of King and State of Washington, have invented certain new and useful Improvements in Hand-Motor Power for Bicycles, of which the following is a specification.

The object of my invention is to add power to the ordinary bicycle for the purpose of making grade-climbing easier, to increase the speed with the same foot-power, and to give greater exercise and exercise more uniformly the whole body of those persons who ride bicycles for exercise and pleasure.

The invention consists of a driving-gear for bicycles comprising a driving-shaft, a ball or sphere rigidly mounted on said shaft, a yoke for mounting the driving-shaft on the steering-head of the bicycle, a transmitting means, and bevel-gears mounted upon and having a pin-and-groove connection with said ball or sphere, with which the transmitting means meshes.

In the drawings, Figure 1 is a side elevation of a bicycle of improved form with my improvement attached. Fig. 2 is a rear elevation of the head of a bicycle with my improvement in position, parts of the frame of the machine being broken away. Fig. 3 is a detail sectional view of the bevel gear-wheel detached from the head of the machine, the ball secured in said wheel being in elevation. Fig. 4 is a detail view of the bevel gear-wheel attached to the crank-shaft, with the bevel-gears of the rods in engagement. Fig. 5 is a detail view of the mechanism for throwing the bevel-gear out of operative position.

1 represents a bicycle of improved construction, having the usual drive-chain and sprocket-wheel, said sprocket-wheel being mounted upon a crank-shaft 2.

3 is a bevel gear-wheel mounted in the center of the crank-shaft 2, between the tubes 4, which form a fork in the lower end of the saddle-post 5 of the machine.

6 is a yoke mounted on the steering-head of the bicycle.

7 is a bevel gear-wheel formed of two parts or sections, as best seen in Fig. 3, such sections being firmly secured together in an approved manner—as, for instance, by screws, bolts, or rivets—said gear-wheel having a central opening, in which is formed a groove 8 from side to side.

9 is a ball of suitable material secured in the opening in the gear-wheel 7 by means of the studs or pins 10, which project and work in the said grooves 8 of the gear-wheel.

11 is a shaft on which the ball 9 is rigidly secured, said shaft being mounted in suitable bearings formed in the upper ends of the yoke 6, the shaft terminating in crank-arms 12, which are provided with suitable grips 13 at their ends.

14 are hand-grips secured to the shaft 10 close up to the yoke 6.

15 is a suitable collar secured to the reach-bar 16 of the bicycle and provided with upwardly-extending lugs 17, provided with rectangular openings.

18 are tubular guides provided with inwardly-extending arms 19, the inner ends of which are bent upward at right angles, as at 20, said right-angle portions 20 being provided with screw-threaded openings. The arms 19 of the guides 18 are passed through the rectangular openings of the lug 17 of the collar 15 and secured together by means of a thumb-screw 21.

22 are rods provided on their respective ends with bevel-gears 23 24. The rods 22 are secured to the bicycle by means of the tubular guides 25, secured to the frame of the machine near the sprocket-wheel, while the upper ends of the rods are passed through the tubular guides 18.

The coöperation of my improved hand-motor with the foot-power is obvious. If it is desired at any time to throw out or disengage the hand-power, it is only necessary to operate the set-screw 21 in the desired direction, whereupon the bevel-gears 24 are thrown out or in engagement with the bevel gear-wheel 7 by reason of the guides 18 through the arms 19 sliding away from or toward the center of the bevel-gear-wheel 7, and for this purpose the resiliency of the rods 22 will be sufficient without disturbing the mesh of the bevel gear-wheel 3 and the bevel-gears 23.

When the hand-power is thrown out of engagement, the rider uses the grips 14 for steering purposes.

By reason of the ball-and-socket joint in the bevel gear-wheel 7 I am enabled to apply hand-power with the front wheel at any angle to the frame of the machine, the ball carrying the gear-wheel 7 when the course of the bicycle is turned as well as when the course is straight. It is of course obvious that the hand-power is applied through the cranks 12.

It is obvious that this improvement may be secured to any foot-propelled vehicle without departing from the spirit of my invention.

What I claim is—

1. A driving-gear for bicycles comprising a driving-shaft, a ball or sphere rigidly mounted on said shaft, a yoke for mounting the driving-shaft on the steering-head of the bicycle, a transmitting means, bevel-gears mounted upon and having a pin-and-groove connection with said ball or sphere, with which the transmitting means meshes, substantially as described.

2. In a bicycle of the character described, the combination with a driving-shaft, a yoke secured to the head of the machine, said shaft being journaled in said yoke, a ball rigidly connected on said shaft, of a bevel gear-wheel mounted on said ball, and means connecting the ball to the gear-wheel whereby the gear may yield in every direction except in that of the rotation of the driving-shaft, and means for transmitting motion from said bevel gear-wheel to the driving-wheel.

3. In a machine of the character described, the combination with the head of the machine of a yoke rigidly connected to said head, a shaft having bearings in said yoke and terminating in crank-arms, a ball mounted on the shaft in the yoke and provided with two diametrically-opposite pins or studs, a bevel gear-wheel having a central opening with grooves, for the reception of the said ball, gears meshing with the said gear-wheel and having a suitable connection with the usual crank-shaft of a bicycle.

4. In a machine of the character described, the combination with the head of the machine, a yoke connected to said head, a shaft journaled in said joke and terminating in crank-arms, a ball rigidly mounted on said shaft and provided with two studs, a bevel gear-wheel having a central opening in which said ball is secured, by means of said studs of rods connecting said power mechanism with the usual crank-shaft, of a collar secured to the frame of the machine, lugs extending upwardly from said collar and provided with rectangular openings, said tubular guides provided with inwardly-extending arms, the ends of which are bent upward at right angles and provided with screw-threaded openings, the set-screw engaging said openings, said tubular guides supporting the rods, while the arms of the guides slide in the rectangular openings in said lugs.

5. In combination with the ball rotatably mounted on the head of the bicycle, a bevel gear-wheel mounted on said ball and yielding in every direction except that of the rotation of the shaft, a gear of the character described, and rods or shafts carrying parts of said gear, a rod or shaft guide comprising a collar having upwardly-extending lugs provided with angular openings, sliding members, one end of each of which is provided with a tubular guide which receives one of the rods or shafts, while the other end is turned up at right angles and provided with a screw-threaded opening, said sliding members adapted to work in the openings of said lugs, and a set-screw adapted to connect the inner ends of said sliding members, as and for the purpose specified.

6. The combination with a bicycle having the usual chain and sprocket gear, of a bevel gear-wheel rigidly secured to the center of the crank-axle, bevel-gears meshing with said gear-wheel, of a bevel gear-wheel having a central opening in which is formed a groove, a ball working in said opening and mounted on pins which work in said groove, a yoke connected with the head of the machine in which said ball is journaled, crank-handles connected with said ball, beveled gears meshing with said gear-wheel, rods or shafts connecting the first-named gear-wheels with the latter, and guides for said rods connected to the frame of the machine; one of said guides being adapted to engage or disengage the beveled gears from the gear-wheel on the bevel-head of the machine.

JOHN D. ATKINSON.

Witnesses:
J. EDGAR BROWN,
CHARLES L. DARST.